Aug. 26, 1924.  
J. R. PEIRCE  
1,506,381

METHOD OF AND APPARATUS FOR PERFORATING RECORD SHEETS

Filed June 7, 1922      10 Sheets-Sheet 1

*Fig. 1*

Inventor  
John Royden Peirce  
By his Attorneys  
Cooper, Kerr & Dunham

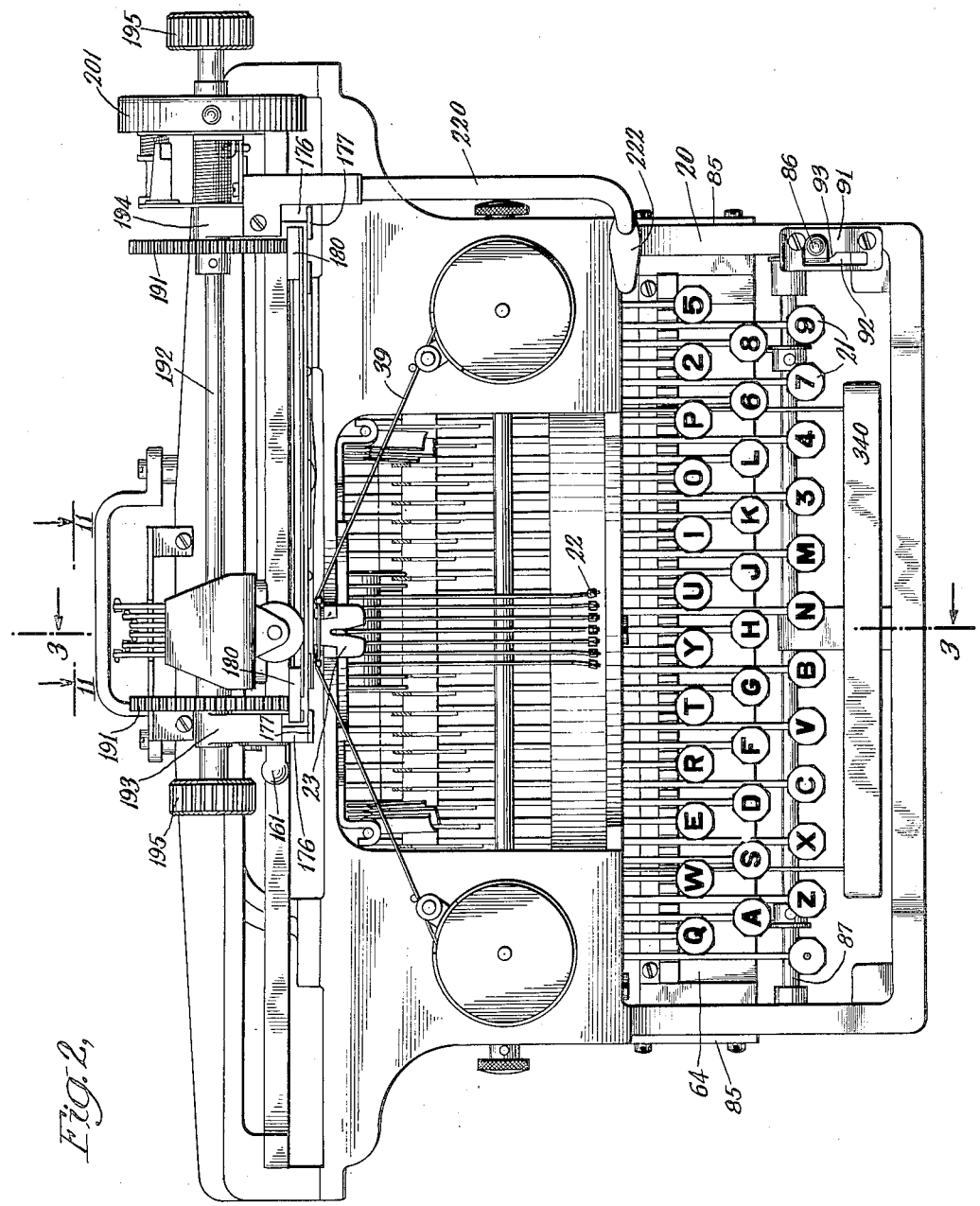

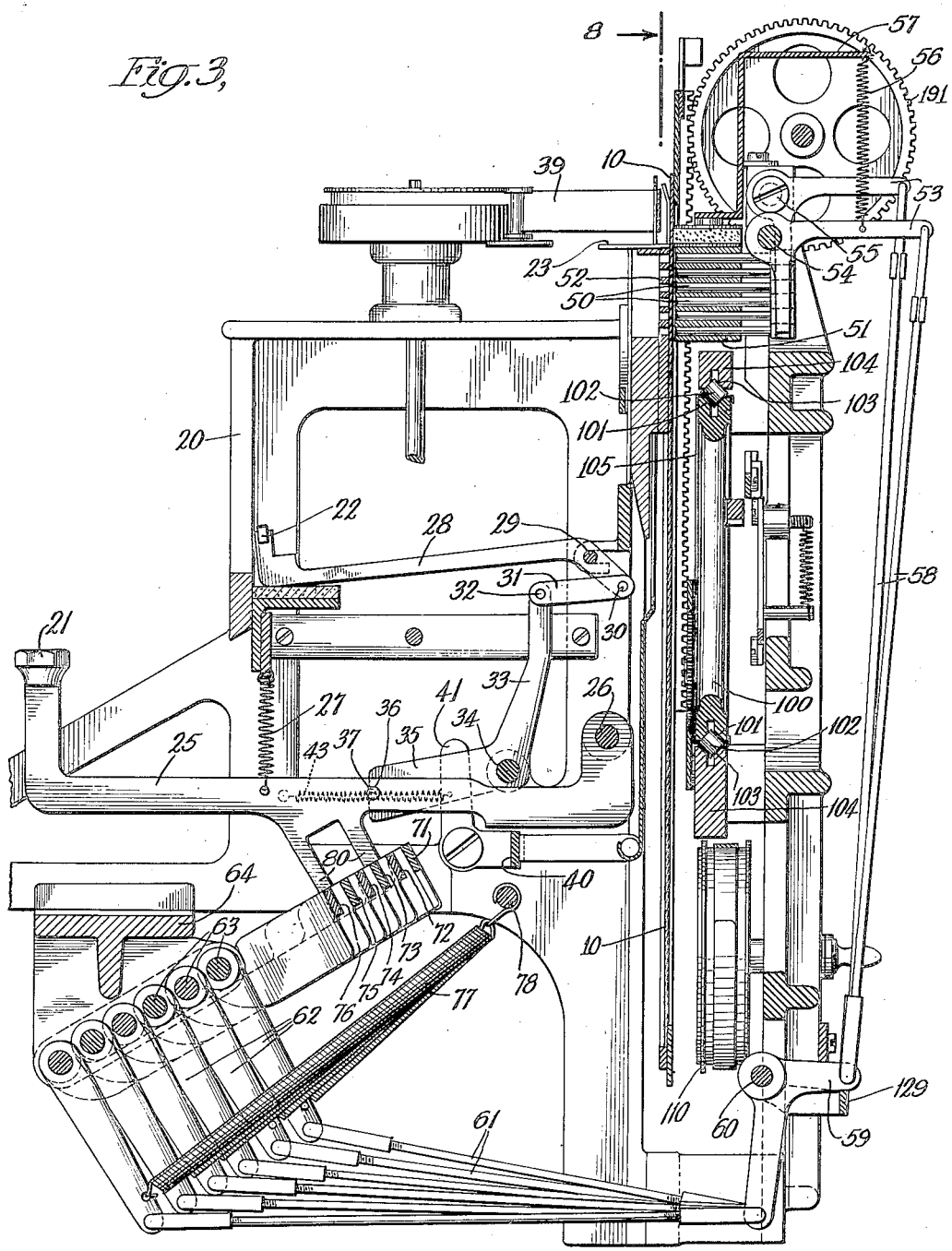

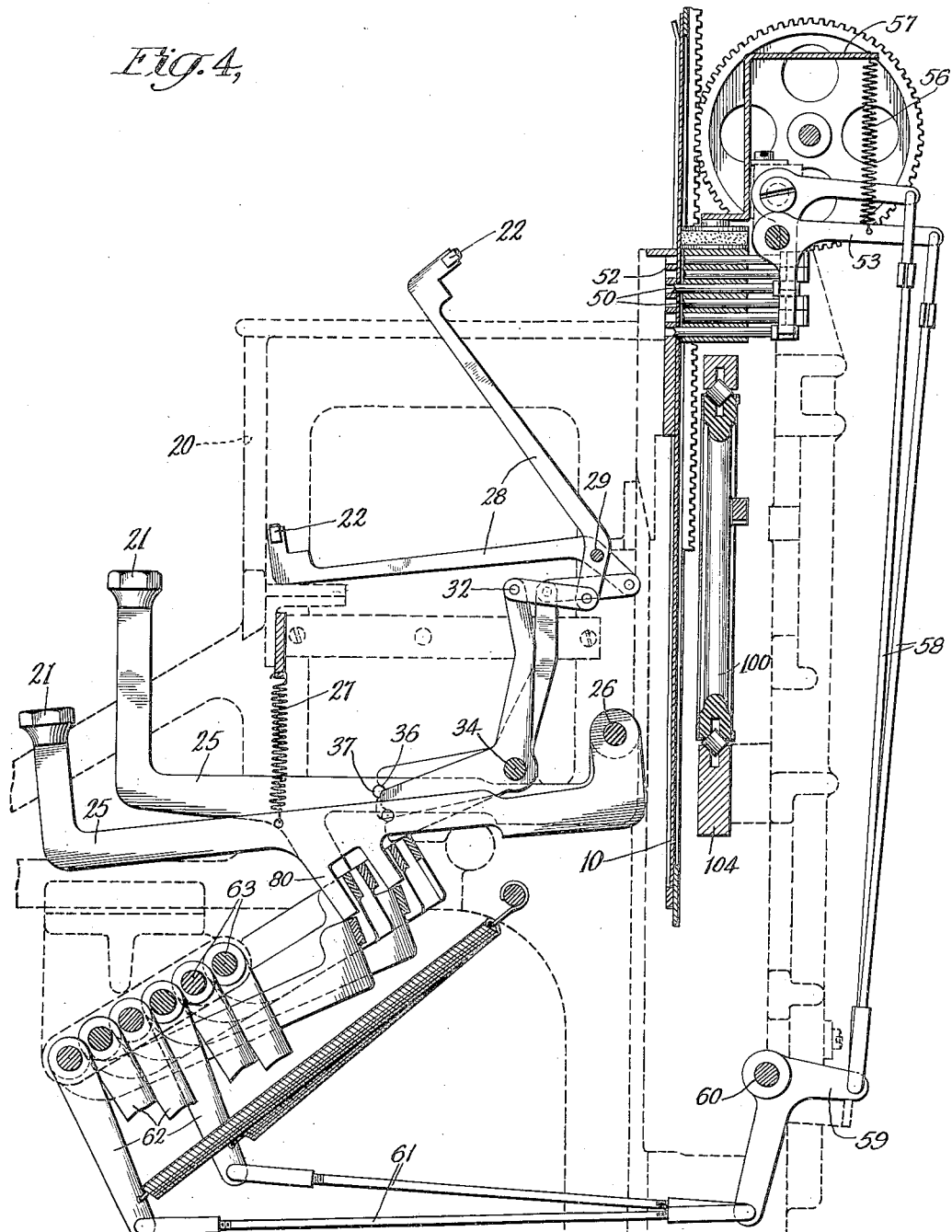

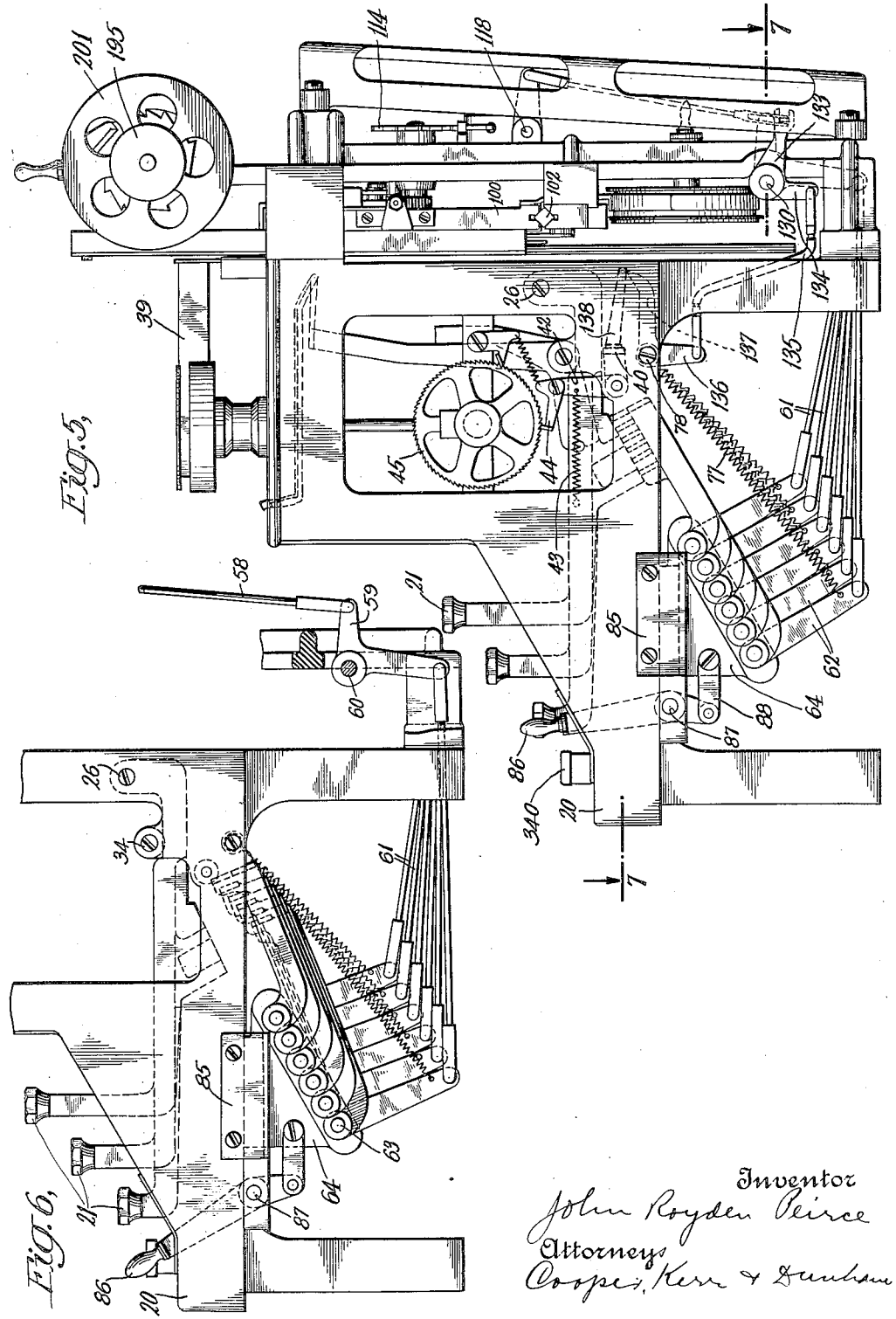

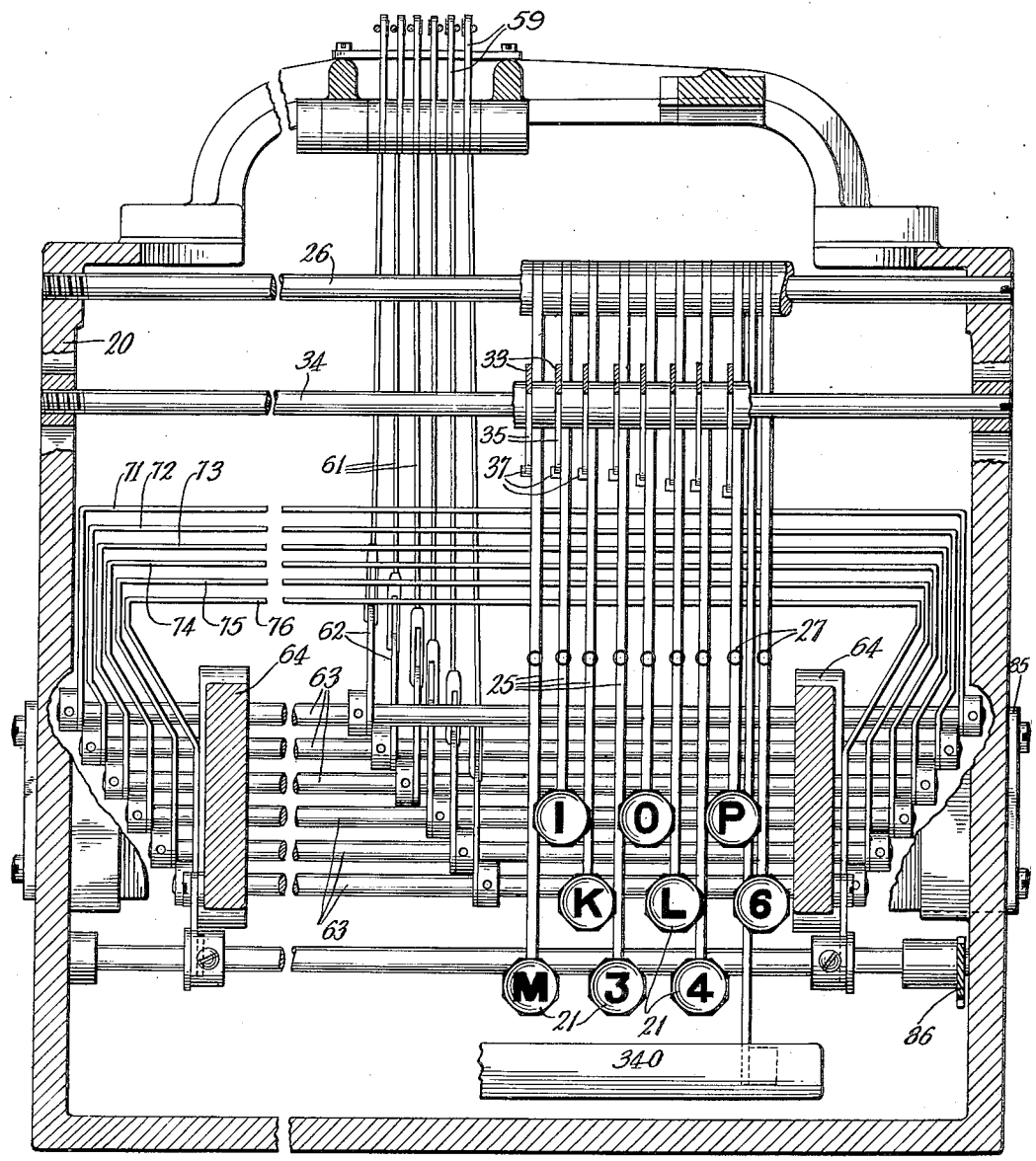

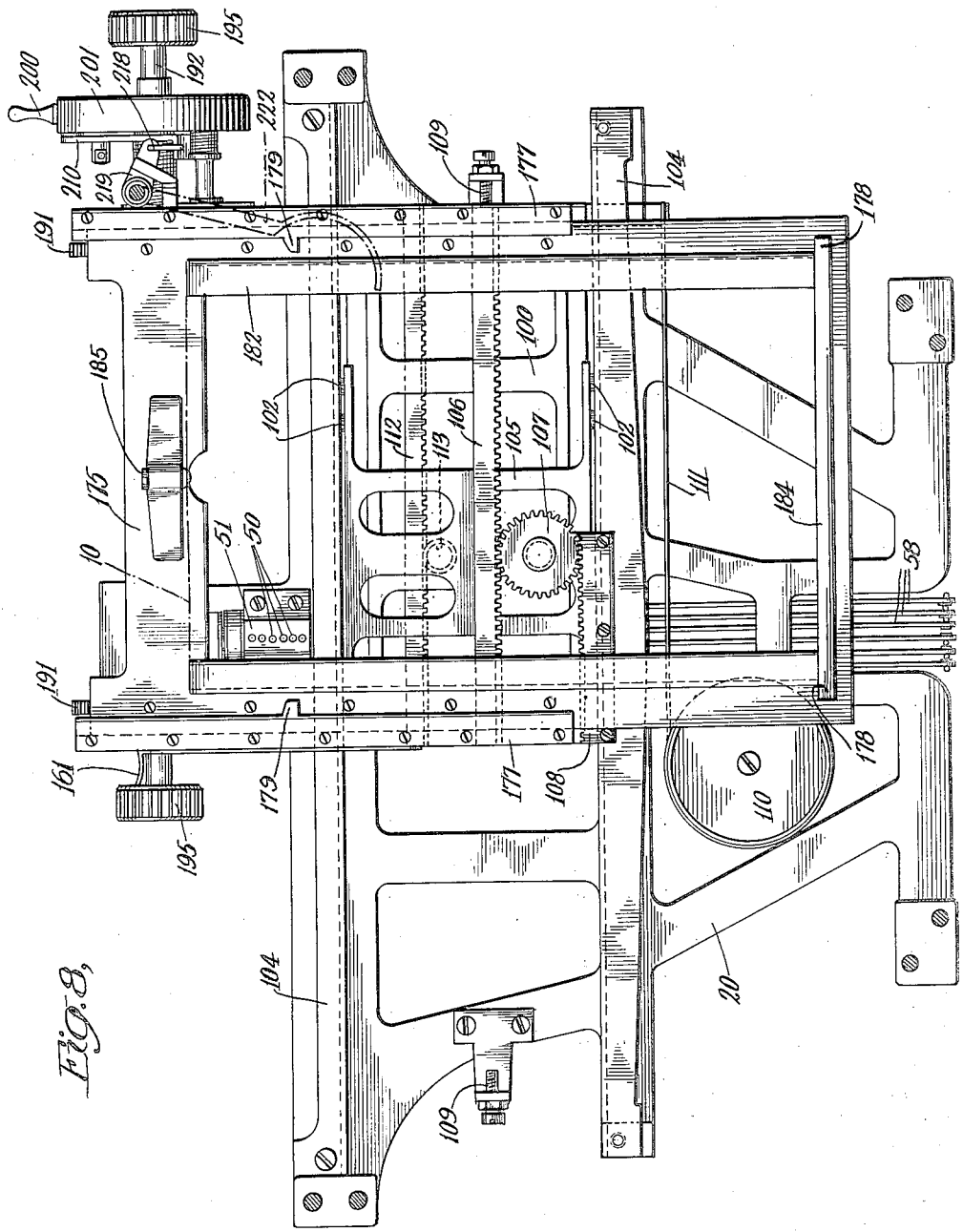

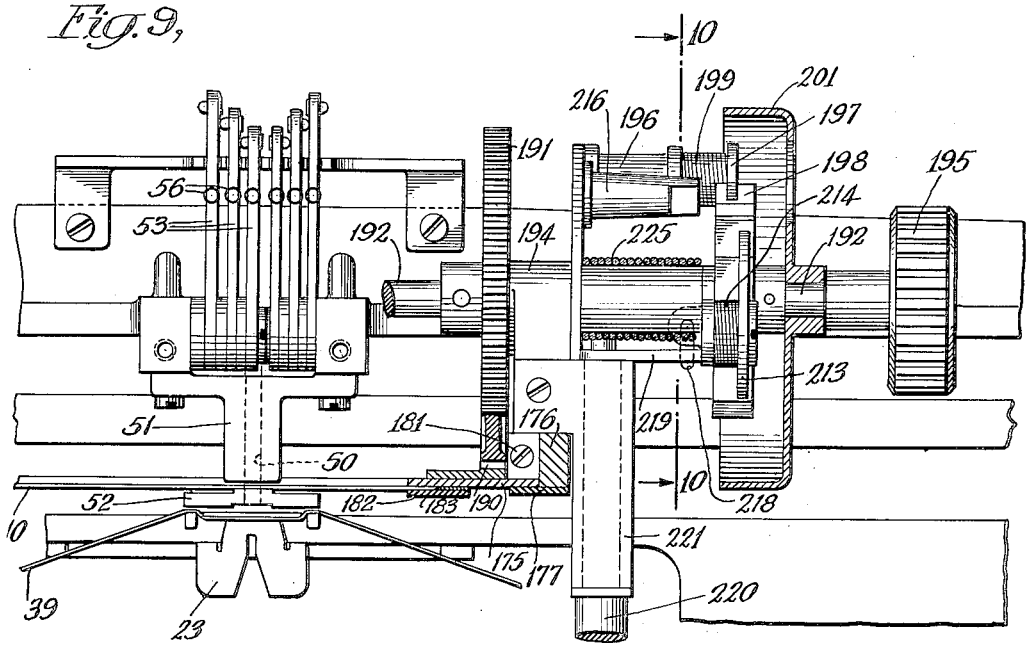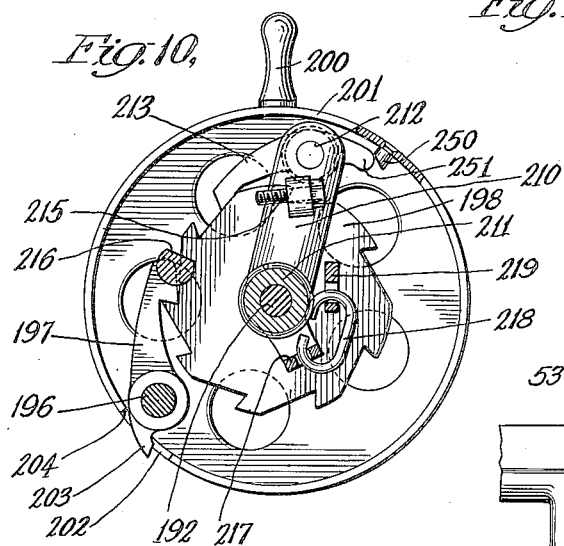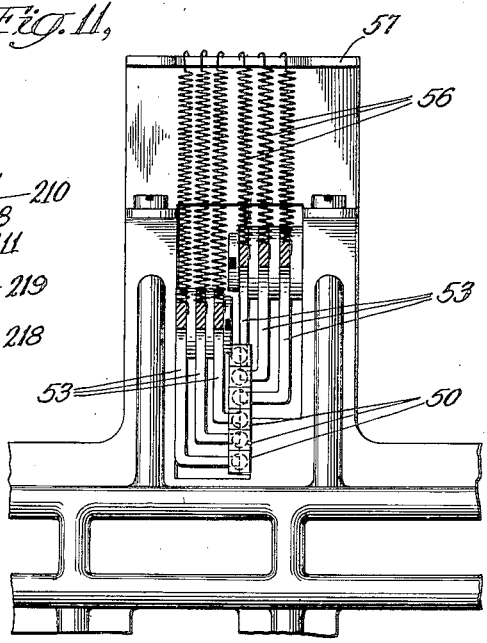

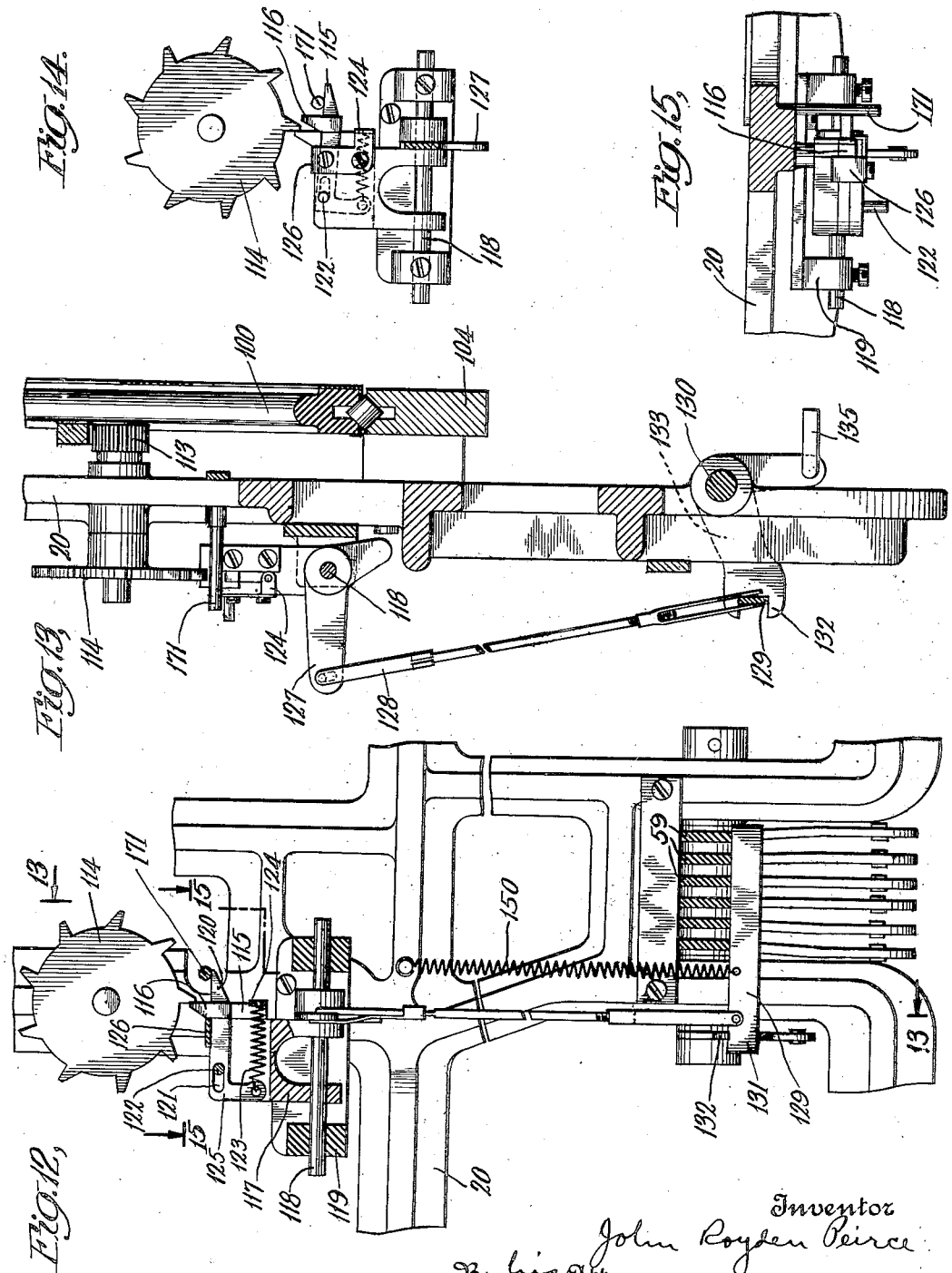

Aug. 26, 1924.
J. R. PEIRCE
1,506,381
METHOD OF AND APPARATUS FOR PERFORATING RECORD SHEETS
Filed June 7, 1922   10 Sheets-Sheet 10
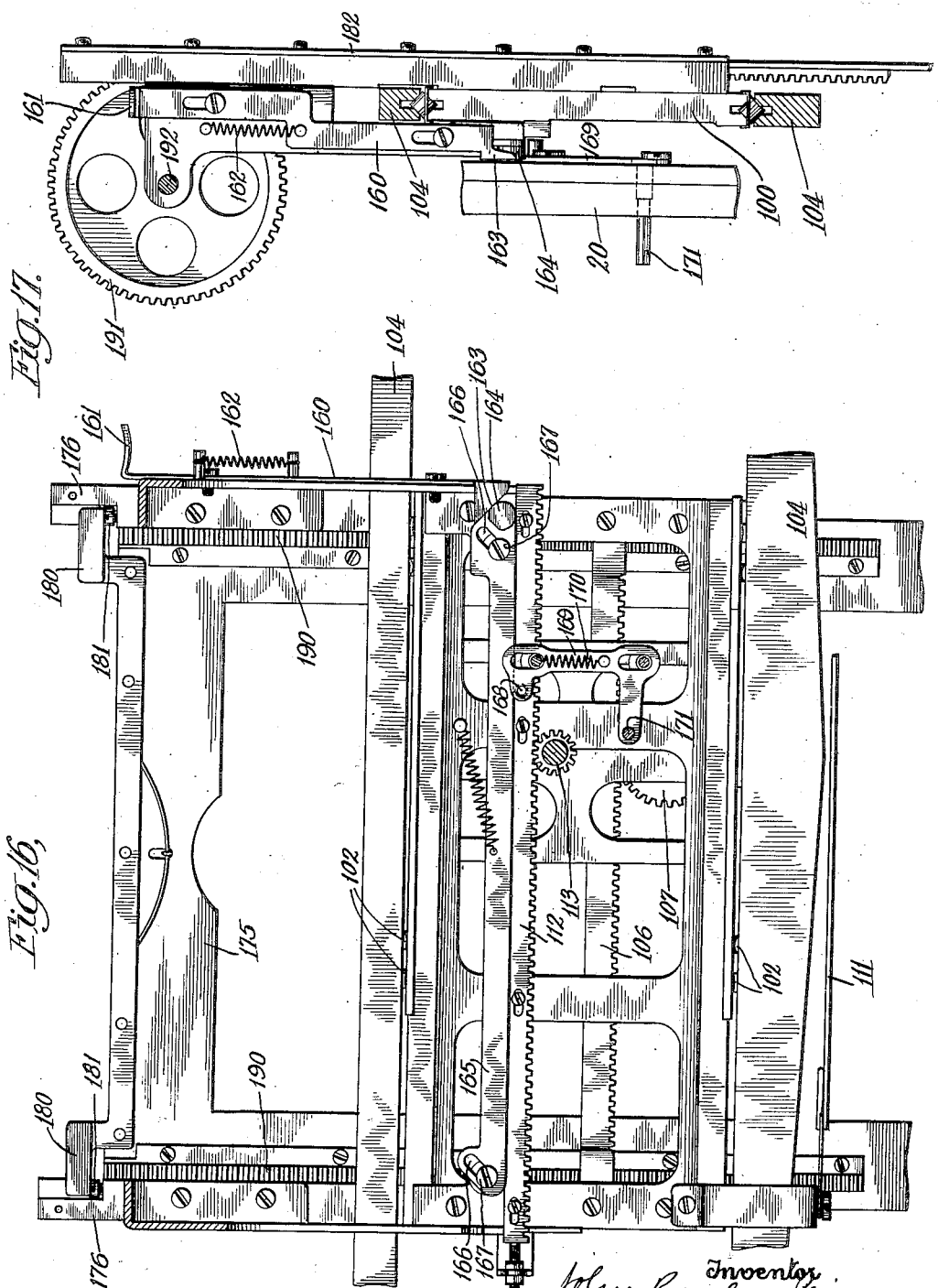

Patented Aug. 26, 1924.

1,506,381

UNITED STATES PATENT OFFICE.

JOHN ROYDEN PEIRCE, OF NEW YORK, N. Y., ASSIGNOR TO COMPUTING-TABULATING-RECORDING CO., OF NEW YORK, N. Y., A CORPORATION OF NEW YORK.

METHOD OF AND APPARATUS FOR PERFORATING RECORD SHEETS.

Application filed June 7, 1922. Serial No. 566,447.

*To all whom it may concern:*

Be it known that I, JOHN ROYDEN PEIRCE, a citizen of the United States of America, residing at New York, in the county of New York and State of New York, have invented certain new and useful Improvements in Methods of and Apparatus for Perforating Record Sheets, of which the following is a full, clear, and exact description.

This invention relates to methods of and apparatus for perforating record sheets and has for one of its objects to provide a novel method of perforation and a preferred form of machine for effecting such perforations.

Machines adapted to receive perforated record sheets, to sense or read the perforations in such sheets, and to effect records of, or accumulate, or perform other functions, in accordance with the data represented by the sheet perforations, are now in common use. A number of such machines are disclosed in my various United States Letters Patent and in certain of my co-pending applications including one entitled "Record sheets and apparatus controlled thereby," Serial No. 566,448, filed of even date herewith, and another entitled "Perforation-reading instrumentalities," Serial No. 566,449, filed of even date herewith. The two last named applications disclose a preferred form of machine adapted to receive record sheets of the general kind hereinafter more specifically disclosed.

While other forms of record sheets may be employed I have selected for the purpose of illustration a record sheet consisting of a card. This card contains one or more fields, and each field is divided (preferably by imaginary lines) into a number of adjacent smaller fields (shown herein in the form of columns) and each smaller field is divided into a number of hole spaces. One of the objects of the present invention is to provide a method of effecting any one of a number of different records representing different characters including the letters of the alphabet, which comprises perforating a record sheet in one or more hole spaces in a field having the theoretical minimum number of hole spaces to accommodate any of the various records.

Another object is to provide an apparatus which is particularly adapted to carry out the method of perforation.

A further object is to provide a perforating and printing machine in which the printing may be accomplished either jointly with the perforating or to the exclusion of the perforating.

A still further object is to provide a machine having key-controlled perforating devices, a carriage for the record sheet, and provisions for insuring that the perforating devices have left the record sheet or card before the carriage is moved or released for movement. Other objects and advantages will appear as the invention is hereinafter disclosed.

Referring to the drawings which illustrate one form of record sheet and what I now consider a preferred form of machine for perforating the sheets:—

Fig. 1 is an elevation of one form of record sheet.

Fig. 2 is a plan view of the machine.

Fig. 3 is a sectional elevation taken substantially on the line 3—3 of Fig. 2 and in which certain parts are omitted for clearness in illustration.

Fig. 4 is a view generally similar but showing some of the parts in a different position.

Fig. 5 is a side elevation of the machine.

Fig. 6 is a fragmentary detail side elevation showing certain of the parts, illustrated in Fig. 5, moved to a different position.

Fig. 7 is a sectional plan view taken substantially on the line 7—7 of Fig. 5 and with some parts broken away.

Fig. 8 is a sectional elevation taken substantially on the line 8—8 of Fig. 3.

Fig. 9 is a fragmentary detail plan view partly in section of a portion of the machine shown in Fig. 2.

Fig. 10 is a section taken on the line 10—10 of Fig. 9.

Fig. 11 is a detail sectional elevation taken substantially on the line 11—11 of Fig. 2.

Fig. 12 is an enlarged detail view partly in section illustrating the escapement mechanism for the carriage.

Fig. 13 is a section on the line 13—13 of Fig. 12.

Fig. 14 is a detail elevation of certain of the parts shown in Fig. 12 but illustrating a different relative position of certain of said parts.

Fig. 15 is a section on the line 15—15 of Fig. 12.

Fig. 16 is an enlarged rear elevation of the carriage, carrier and certain connected parts.

Fig. 17 is a side elevation of the structure illustrated in Fig. 16.

While the method devised by me may be employed in connection with other record sheets, I shall now explain its connection with the card illustrated in Fig. 1. This card 10 is provided with a plurality of fields 11, 12, 13, etc., adapted to receive various combinations of perforations. A description of one of these fields will suffice for all. The field 12 is divided (preferably by imaginary lines shown dotted) into a number of smaller fields. In the present case these smaller fields are each in the form of adjacent columns. Each column has a number of hole spaces sufficient to accommodate any one of various combination arrangements of perforations. In order to provide a different combination arrangement for each of the letters of the alphabet, at least twenty-six different combination arrangements are necessary. The maximum number of different combination arrangements of perforations in a field having four hole spaces, is fifteen. Therefore a column or field of four hole spaces will not suffice to represent the different letters of the entire alphabet. However, if a field or column of five hole spaces is employed, thirty-one different combination arrangements may be secured. This provides enough different combination arrangements of perforations to cover the entire alphabet. Therefore, if it is desired to represent any one of a total of thirty-one different characters, columns of five hole spaces each may be employed and this would be the theoretical minimum number of hole spaces per field (i. e. column) to accommodate any of the various characters. In the present case I desire not only to represent the various letters of the alphabet but the digits 0 to 9 inclusive as well, and also to represent at least one punctuation mark. Even though the character "O" be employed to represent both a letter and a cipher and the character "I" similarly employed, there must be more than thirty-one different character-representing combination arrangements of perforations. Five hole spaces will therefore not suffice. I employ six hole spaces which is the theoretical minimum number for the purpose.

In Fig. 1 each of the larger fields 12 and 13 is divided, as above stated, into a series of adjacent columns or smaller fields, and each of the latter is shown provided with six hole spaces. While other combination arrangements of perforations may be employed to represent the different characters and other or additional characters may be represented, I prefer to employ the system shown in Fig. 1 in the main fields 12 and 13. In that system the combination arrangement of perforations vertically below any printed characters, such as A, B, C, etc. or 1, 2, 3, etc., represents that character. It will be understood of course that any of these thirty-five different character-representing combination-arrangements of perforations may be impressed in any of the various smaller fields or columns so that words, numbers or other intelligence-conveying records may be effected.

I wish to emphasize that this combination hole system is one in which the number of hole spaces in each smaller field or column to accommodate the various combination arrangements of perforations, corresponding to the letters of the alphabet and to the various digits, is an absolute minimum. An attempt to use only five hole spaces for this purpose would fail for reasons previously pointed out. By employing six hole spaces, sixty-three different combination arrangement of perforations may be obtained. This is amply sufficient to provide a distinctive record for each of the letters of the alphabet and for the various digits and, if desired, other distinctive records may be employed, to designate punctuation marks, etc., well within the possible limit of combinations of holes. Thus, as shown in Fig. 1, one of the combination arrangements represents a period (.). It should be noted further that not only is the system one which utilizes the minimum number of hole spaces required for the accommodation of the thirty-four or more different characters but also one which employs the minimum number of perforations to represent the various characters. To explain this more fully attention is called to the fact that in accordance with the invention all of the six possible combination arrangements of single perforations are utilized. Thus the characters E, O, 1, 2, 5 and . are each represented by a single perforation, each of such single perforations being located in a different hole space than that in which any other is located. The system also utilizes all of the possible combination arrangementsments of two perforations. The characters R, M, P, U, Y, T, W, Q, H, 3, 4, 6, 7, 8 and 9 are each represented by two perforations in different combination arrangements. This utilizes all fifteen of the possible combination arrangements of two perforations. The remainder of the characters, i. e., in the present case the characters —Z, X, S, C, V, B, N, G, A, L, K, J, D, F—are each represented by three perforations in different combination arrangements. Thus all of the one perforation combination arrangements, all of the two perforation combinations, and some of the three perforation combinations are utilized.

In addition the various combinations preferably so selected as to utilize the single perforations to represent characters which are most likely to occur most repeatedly in the particular service in which the system is emp'oyed (see for example the letter E), and the two hole arrangements to represent characters which are next in order in their frequency of occurrence.

By virtue of these features described above in connection with the hole spaces and combination arrangements, the card-space required to accommodate the desired information is minimized, the labor in punching is minimized and the wear upon the perforation-sensing or reading elements and connected parts in the machines in which the cards are later employed, is greatly reduced.

At this point I wish to call attention to the further fact that but four of the hole spaces (the upper four) of any field or column are employed to represent the various digits. Therefore any main field in which it is desired to represent only the digits, need be provided with only four hole spaces per column or smaller field. (See for example the fields 11 and 15 in Fig. 1.)

Having disclosed my improved method of effecting a record by perforations I shall now proceed to describe a preferred form of machine by means of which this method may be quickly and accurately performed.

The machine is designed not only to effect the necessary perforations in any desired column or columns, but preferably also to print at the head of each column the character represented by the combination arrangement of perforations immediately below. I shall now proceed to describe the

*Printing mechanism.*

This mechanism is generally similar to the ordinary typewriter. The frame 20 of the machine is provided with a plurality of individually movable keys 21, one for each of the characters desired to be represented. A plurality of type 22 are provided, one for each of the various characters, and each movable from a normal position to an actuated position through a common type guide 23 to printing position, upon depression of a corresponding one of the keys. In view of the fact that the mounting of each of the keys, the type corresponding to each key, and the connections between each key and its type are generally similar, a description of one key and its connections will suffice for all.

Referring particularly to Fig. 3, the key 21 is carried by an arm 25 pivoted on a rod 26 carried by the frame 20. A tension spring 27 connected to the frame 20 and to the arm 25 serves to bias the latter toward elevated position. The type 22 is carried by a bell-crank 28, pivoted at 29 on the frame and whose shorter arm is pivotally connected at 30 to a link 31. The other end of the link 31 is pivotally connected at 32 with the arm 33 of a bell-crank lever pivoted on a rod 34 carried by the frame of the machine. The other arm 35 of the bell-crank is provided with a notch 36 in which a pin 37 seats, this pin being secured to the arm 25 so as to project laterally therefrom. Obviously depression of any key 21 will cause a corresponding one of the type 22 to move from normal position (Fig. 3) through the guide 23. Release of the key permits the corresponding one of springs 27 to restore the parts to normal position.

The printing is effected upon the card or other record sheet 10 adapted to be mounted in the machines as hereinafter described and the usual inking ribbon 39 is provided. This inking ribbon is advanced step-by-step, one step upon actuation of any of the keys 21. For this, and other purposes, a bail 40 (Fig. 3), pivotally connected at its opposite ends to the frame of the machine, extends below and across all of the arms 25. This bail 40 is provided at its opposite ends with arms 41, 42 (see also Fig. 5) each of which has a corresponding one of two tension springs 43 connected to it, the opposite ends of said springs being connected to the frame of the machine. The arm 42 carries a pawl 44 adapted to actuate the ratchet wheel 45 upon depression of any of the various keys. The ratchet wheel actuates the usual instrumentalities for feeding the ribbon 39 from either of the two ribbon spools to the other at will.

*Perforating mechanism.*

Mounted vertically below the position at which any of the character is printed, as above described, are a plurality of perforating devices or punches 50. The number of these devices will depend upon the particular system employed. In the present case there are six such devices and this will hereinafter be referred to in the order of their arrangement starting with the upper one, as the first, second, third, fourth, fifth or sixth punch. These punches are shown slidably mounted in a guide 51 and adapted to pass through a card 10 into the registering perforations provided in an anvil 52. Each of the punches 50 is slotted to receive an arm of a corresponding one of six bell-crank levers 53, three of which are pivoted at 54 and the other three at 55, on the frame of the machine. Upon movement of any of the bell-cranks 53 a corresponding one of the punches 50 is moved in one direction or the other in accordance with the direction of movement of the bell-crank. Tension springs 56, each secured at one end to a corresponding one of the levers 53 and at its other end to a bracket 57, serve to bias the punches and bell-cranks to the position shown in Fig. 3. Each of the six bell-cranks 53 is connected by a corresponding one of six links 58 to a corresponding one of six bell-cranks 59 pivoted at 60 on the frame of the machine. The other arms of the six bell-cranks 59 are each connected by means of a corresponding one of six links 61 to a corresponding one of six arms 62. Each of the six arms 62 is secured to a corresponding one of six rock shafts 63 journaled at their opposite ends in an auxiliary frame portion 64. Each of the six rock shafts 63 has secured thereto a corresponding one of six bails 71, 72, 73, 74, 75, 76 (Figs. 3 and 7) which normally extend below and across all of the arms 25 as shown in Fig. 3. Six tension springs 77, each secured at one end to a rod 78 carried by the frame and at its other end to a corresponding one of arms 62, serve to bias the parts to the position shown in Fig. 3.

Obviously if any one of the bails 71 to 76 is depressed a corresponding one of the punches 50 will be actuated to perforate a card 10. Thus if the bail 71 is depressed, the first punch will be operated; if the bail 72 is depressed, the second punch will be operated; and so on. When a depressed bail is released the springs 56 and 77 restore the parts to normal position shown in Fig. 3.

Each of the key arms 25 is provided with one or more depending lugs 80 adapted to engage and depress certain of the bails 71 to 76 to actuate corresponding one of the punches. In the present case, each of the thirty-five key arms 25 is provided with one, two or three lugs 80 so arranged as to effect a combination arrangement of perforations corresponding to the character printed upon actuation of the particular key. For example, the key 21 shown in Fig. 3 is the "H" key and is provided with two lugs 80, one of which is adapted to engage the bail 73 and the other the bail 76. Bails 73 and 76 actuate the third and sixth punches respectively. The combination of the third and sixth perforations represents the character "H" as will be apparent upon inspection of the code shown in Fig. 1. Therefore when the H key is depressed, the letter H will be printed upon the card 10 and the card will be perforated, immediately below the printed character, in a manner to represent the letter "H."

Fig. 4 shows the "H" key in depressed position. Preferably, the parts are so designed that when any key 21 is depressed, the perforation of the card 10 is performed before the type 22 corresponding to that key imprints its charater upon the card. This is clearly illustrated in Fig. 4.

It will now be clearly understood that when any of the thirty-five keys 21 is depressed a combination arrangment of perforations corresponding to that key will be effected in the card and a character represented by that particular combination (see the code in Fig. 1) will be printed above the perforations. Thus any one of thirty-five different characters may be recorded in any selected column on the card 10 by depression of a corresponding key.

I prefer to provide means whereby the printing mechanism may be operated to the exclusion of the perforating mechanism. I therefore provide a

*Throw-out for the perforating mechanism.*

The auxiliary frame 64 is slidably mounted, in end brackets 85 secured to the main frame 20, so as to move from the position shown in Figs. 3, 4 and 5 to the positions shown in Fig. 6, and vice versa. In the first mentioned position of parts, the bails 71 to 76 are in position to be engaged and actuated by the lugs 80 on the key arms 25 to actuate the perforating mechanism. When the parts are in the other position (Fig. 6) the bails 71 to 76 are so far below the arms 25 as not to be engaged and auctuated by the lugs 80 upon depression of any of the keys 21. In this position of parts, depression of any of the keys operates the printing mechanism to the exclusion of the perforating mechanism.

For actuating the auxiliary frame 64 from either of its two positions to the other and for holding it in such position, I provide a hand lever 86 pivotally mounted on the main frame 20 at 87 and connected by a link 88 to said auxiliary frame 64. The upper end of the lever 86 (Fig. 2) passes through a plate 91, secured to the frame 20, a slot 92 being provided in the plate for this purpose. The arm 86 is biased toward the right (Fig. 2) by virtue of its inherent resiliency and, in order to move from either of its two positions to the other, must pass the inwardly projecting shoulder 93 on the plate 91. In Fig. 2 the lever 86 is shown in the position for causing joint operation of the printing and perforating mechanisms. If pulled forwardly, i. e., toward the operator, the frame 64 will be moved to the position shown in Fig. 6 and the printing mechanism operated to the exclusion of the perforating mechanism.

Means are provided for holding a record sheet (a card in this case) in the machine and for moving it both laterally and longitudinally with respect to the position at which the recording (printing or printing and perforating) is effected. The purpose in moving the card laterally is to present different columns or smaller fields to the recording mechanism. The principal purpose of the longitudinal movement is to present different main fields, 11, 12, 13, etc., to the recording mechanism. While the means last mentioned may assume various forms I prefer to provide a laterally moving carriage and a card carrier longitudinally movable upon the carriage. These will be hereinafter referred to as the card carriage and the card carrier respectively.

Card carriage and operating mechanism therefor.

The carriage 100 (Figs. 3 and 8) is provided with two grooves or troughs 101 each of which is V-shaped in cross-section and adapted to receive rollers 102. These rollers 102 extend into grooves 103, similar to grooves 101, provided in track members 104 secured to the main frame 20 of the machine. By virtue of this construction the carriage 100 may be moved laterally with respect to the machine frame.

A guide frame 105 is provided for the rollers 102 and is constrained to move about one-half the distance moved by the carriage. This guide frame 105 is flanged over, at its upper and lower edges, around the carriage as clearly indicated in Fig. 3. The upper and lower flanges of the frame 105 are provided with guide openings, one for each of the rollers 102 and the latter have no relative movement other than one of rotation with respect to the said guide frame 105.

The carriage 100 has a rack 106 secured thereto and which meshes with a gear 107 rotatably mounted on the guide frame 105. The gear 107 meshes also with a rack 108 secured to the lower track 104 and consequently fixed with respect to the main frame. By virtue of this construction any movement of the carriage 100 with respect to the main frame 20 imparts one-half that movement to the guide frame 105. Adjustable stops 109, 109 are provided on the main frame 20 to limit the lateral movement of the carriage.

The carriage 100 is biased toward the left (Fig. 8) by means of the usual torsion spring drum 110, carried by the main frame 20, and flexible band 111 secured to said drum and to the carriage 100. The carriage is controlled in such movement by a carriage release mechanism which I shall now describe.

The carriage 100 has a rack 112 secured thereto which meshes with a pinion 113 secured to a shaft journaled in the main frame 20. A ratchet wheel 114 (Fig. 5 and Figs. 12 et seq.) is secured to the shaft of the pinion 113. The ratchet wheel 114 is controlled by an escapement consisting of two pawls or dogs 115, 116 carried by a block 117. The latter is secured to a shaft 118 journaled in a bracket 119 secured to the frame 20 of the machine. The pawl 115 is fixed to the block 117 and the pawl 116 is secured to one arm of a bell crank lever 120 provided with a slot 121 through which the pin 122 secured to the block 117 extends. The other arm 125 of the lever 120 has secured thereto one end of a tension spring 123, the other end of which is secured to the arm 124 of a bracket secured to the block 117. The upward movement of the pawl 116 is limited by engagement of the arm 120 with the member 126 carried by the bracket of which the arm 124 is a part. The shaft 118 has an arm 127 secured thereto which is connected by means of a link 128 to a bail 129 pivotally mounted at 130 on the main frame of the machine. This bail has a laterally projecting portion 131 which extends through the forked end 132 of a bell-crank lever 133, pivoted at 130. The other arm 134 of the lever 133 is connected by a link 135 to the arm 136 of a bell-crank lever pivoted on the rod 78, previously referred to.

The other arm 137 of the last mentioned lever is adapted to be engaged and operated by an arm 138 secured to the bail 40 previously described. It will be borne in mind that the depression of any of the thirty-five keys 21 or the space bar 340 depresses the bail 40. The operation of the automatic carriage release may now be explained as follows.

The pawl 116 is normally in the path of the teeth of ratchet wheel 114 and prevents rotation of the latter. Upon depression of any of the keys 21, or the space bar 340, the bail 40 and its arm 138 are depressed to depress the arm 137. This causes the arm 127 to be depressed and rotates the block 117 to move the pawl 116 out of the path of the ratchet teeth on the wheel 114. Movement of the wheel 114 is not yet permitted because before the pawl 116 has moved out of the path of the particular ratchet tooth the pawl 115 will have moved into engagement with the same tooth. When the particular depressed key or space bar is released the tension spring 150 (secured at its opposite ends to the frame 20 and bail 129) restores the block 117 to original position. The pawl 116 will not be in the path of the same tooth but will have passed behind the same upon its disengagement therewith. Therefore when the pawl 115 disengages the particular tooth the ratchet wheel is permitted to rotate until the next succeeding tooth engages the pawl 116. This permits the carriage to be moved to the left (Fig. 8), by the drum 110 and band 111, a distance equal to the center-to-center distance between adjacent columns (or smaller fields) of the record card. Obviously when the carriage 100 has been so moved to its extreme left hand limit of travel it may be readily restored to its right hand position manually as in the operation of an ordinary typewriter.

Under certain conditions it may be desirable to release the ratchet wheel to permit increments of travel greater than one column space. To this end I provide the following now preferred mechanism.

A slide 160 (Figs. 16 and 17) is mounted by means of pin and slot connections to bracket 193 on one side of the carriage 100 so as to be capable of vertical sliding movement with respect thereto. The slide 160 is provided with a thumb piece 161 for depressing the same. The slide 160 is biased to upper position by means of a spring 162 secured at its opposite ends to the slide 160 and the carriage 100 respectively. The slide 160 is provided with a cam portion 163 adapted to engage a lug 164 provided on a strip or plate 165. The latter is provided with inclined slots 166 which receive pins 167 secured to the carriage 100. The strip 165 is adapted to engage a pin 168 secured to a frame 169 mounted for vertical sliding movement upon and with respect to the frame 20. The frame 169 is biased to elevated position by means of a spring 170 secured at its opposite ends to the frame 169 and frame 20 respectively. The frame 169 has secured thereto a pin 171 which is adapted to engage and depress the arm 120 to move the pawl 116 carried thereby from the path of the teeth carried on the ratchet wheel 114.

No matter how far the carriage 100 may be from its extreme left hand position (Fig. 8) depression of the thumb piece 161 will cause depression of the pin 171 (through the instrumentalities above described) to release the ratchet wheel. This will permit the drum 110 and band 111 to move the carriage 100 to the left until the thumb piece 161 is released, unless the left hand stop 1.9 has been engaged by the carriage prior to such release of the thumb piece. When the thumb piece 161 is released the various springs restore the parts previously actuated thereby to normal position.

It is important that the carriage 100 be prevented from moving under the action of the spring drum 110 upon release of an depressed key 21 until all of the punches 50 actuated by such key have been withdrawn. I therefore provide:

*Means for preventing movement of the card carriage upon release of any key until after the punches are withdrawn.*

The bail 129 extends below and across all six of the punch-controlling bell-crank levers 59 (see Fig. 3) and cannot move upwardly sufficiently to move the pawl 115 out of, and the pawl 116 into, the path of the ratchet teeth on the wheel 114, unless all of the bell-cranks 59 have been rotated counterclockwise (Fig. 3) to an extent sufficient to permit movement of each and all of the punches 50 to the withdrawn position shown in Fig. 3. In short the punches 50 must have been withdrawn from the record sheet 10 before the escapement 115, 116 can operate to release the ratchet wheel 114.

If it is desired to print and perforate cards having only one main field or a plurality of main fields laterally but not longitudinally spaced, the card carriage 100 may be designed with a pocket such as that disclosed in my U. S. Patent No. 998,631. However, I prefer to adapt the machine to print and perforate cards or record sheets having two or more longitudinally spaced main fields. Therefore, as stated above, I prefer to employ not only the card carriage above described but a card carrier mounted thereon for relative longitudinal movement with respect thereto.

*Card carrier.*

Calling attention to Figs. 2, 3, 8 and 9, it will be seen that the card carrier comprises a frame portion 175 vertically slidable in guides formed by the spaced uprights 176 (of the carriage 100) and plates or strips 177 detachably secured thereto. The upward movement of the carrier 175 is limited by lugs 178 each of which is secured to the carrier and each of which is adapted to engage a corresponding one of inwardly projecting lugs 179 secured to the strips 177. The downward movement of the carrier 175 is limited by lugs 180 each secured to the carrier 175 and each of which is adapted to engage a corresponding one of two screws 181 each mounted in a corresponding one of the spaced uprights 176.

The carrier 175 is provided with a card-receiving pocket comprising a plurality of side strips 182 secured to but spaced from the carrier by spacing strips 183. Guides are thus formed into which a card 10 may be slid. A card 10 when mounted in these guides is adapted to abut, at its bottom edge, the stop 184 and when in this position the card may be detachably held in the pocket by first raising a catch 185 and then lowering it over the front of the card. The catch 185 is mounted on the carrier 175 for vertical sliding movement and preferably biased by gravity or a suitable spring to its card-engaging position.

It will be noted that the carrier 175 is adapted to receive cards 10 one at a time, and is movable laterally together with the carriage 100 to present different columns or laterally spaced fields to the recording devices. Furthermore the carrier 175 is longitudinally movable with respect to the carriage 100 to present different longitudinally spaced fields to the recording devices. I shall now proceed to describe a preferred form of

Carrier-operating mechanism.

The carrier 175 has secured to the rear face thereof a pair of racks 190 each of which meshes with a corresponding one of a pair of gears 191 secured to a shaft 192. The shaft 192 is journaled in brackets 193, 194 each secured to a corresponding one of the uprights 176 of the carriage 100. The shaft 192 may be operated to elevate the carrier 175 by turning a knob 195 secured to said shaft.

The bracket 194 carries a post 196 upon which a holding pawl 197 is pivotally mounted. The pawl 197 is adapted to engage various ones of the teeth on a ratchet wheel 198 secured to the shaft 192. The pawl is biased to ratchet-engaging position by means of a torsion spring 199 mounted on the post 196 and secured at its opposite ends to the post and pawl. The teeth upon the ratchet 198 are so designed that the holding pawl 197 will cooperate therewith to releasably hold the carrier in its various elevated positions in each of which a corresponding one of the different fields 11, 12, 13, 14, etc. of the card 10 is held in proper position for printing and perforating. If these fields were uniformly spaced the ratchet teeth would be similar in design and angular spacing. In the case of the card 10 illustrated herein the fields 11, 12, 13, etc. are irregularly spaced longitudinally. The ratchet teeth are therefore correspondingly spaced apart different angular amounts. In short, as the carrier 175 is elevated the pawl 197 will hold it in successive positions in each of which a corresponding field 11, 12, 13, 14, etc., is properly presented to the printing and perforating devices.

The pawl 197 may be disengaged from the ratchet 198 at any time to permit the carrier 175 to drop by moving a handle 200 forwardly (or to the left as viewed in Fig. 10). The handle 200 is secured to a cup-shaped member 201 mounted upon but rotatable with respect to the shaft 192. The flange of the member 201 is provided with an opening 202 through which the tail 203 of the pawl 197 extends. When the handle 200 is operated as above described the edge 204 of the member 201 engages the tail piece 203 to cause the pawl 197 to disengage the ratchet 198.

While the instrumentalities above described are adequate for operating the machine and carrying out the method, I prefer to provide a manually operable member and mechanism actuated thereby for shifting the carriage 100 to the right and elevating the carrier 175 to present the next lower main field of the card, by a single actuation of said member. This means may assume the following form.

A pawl arm 210, secured to a sleeve 211, has pivotally mounted thereon, at 212, a pawl 213. The latter is biased toward the ratchet wheel 198 by a spring 214 surrounding the pivot 212 and secured at its opposite ends to the pawl 213 and arm 210. The pawl arm is movable from the position shown in Fig. 10 to a position limited by the engagement of an adjustable stop 215, carried by the arm 210, with a post or stud 216 carried by the bracket 194. The sleeve 211, to which the pawl arm 210 is secured and which is loosely mounted on the shaft 192, has secured thereto an arm 217. The latter is connected by means of a link 218 to an arm 219 secured to a rock shaft 220 journaled in a bracket 221 secured to the carriage 100. The shaft 220 is provided with a depending finger piece 222 (Fig. 2) whereby it may be manually operated.

Whenever the depending finger piece 222 is engaged and moved to the right (Figs. 2 and 8) the carriage 100 will be moved to the right (if it is then capable of such movement) and the shaft 220 will be rotated to actuate the arm 210 until the stop 215 engages the post 216. The design and adjustment of parts is such that this movement of the arm 210 is sufficient to impart, through the pawl 213, such movement to ratchet wheel 198 as to move any particular tooth away from the holding pawl 197 and to place the next succeeding tooth thereunder. A spring 225, secured at one end to the arm 210 and at its other end to the bracket 194, biases the arm 210 and connected parts to the position shown in Fig. 10.

It will be noted that successive equal actuations of the finger piece 222 (and of arm 210) move the carrier 175 different distances because of the above described angular spacing of the ratchet teeth on the wheel 198. The design is such that when the field 11 has been perforated and the number 222 operated as above described, the next lower field, i. e., field 12 will be properly presented for printing and perforation and so on. The member 201 is provided with a pin 250 adapted to engage the tail 251 of the pawl 213 to throw the latter out when the handle 200 is operated to throw the pawl 197 out.

While the operation of the machine illustrated will now be apparent to those skilled in the art in view of the foregoing disclosure, it may be summarized as follows.

Summary of operation of machine.

A card such as the card 10 (Fig. 1) is placed in the pocket of the card carrier 175. The carriage 100 is then moved to the right, and the carrier 175 is dropped by pulling the handle 200 backward. If it is desired to print and perforate, the handle 86 is placed in the position shown in Fig. 2. If it is desired only to print, the handle 86 is pulled forwardly. Various keys 21 may now be operated in succession to print in the upper portion of the field 11 in the usual manner. Immediately before each character is printed, a combination arrangement of perforations corresponding to the particular character will be effected in the column (or small field) immediately below the position where the printed character will come. Words or numbers or symbols may thus be represented in the field 11. When all of the desired information has been recorded in the field 11, the member 222 (Fig. 2) is pushed to the right. This moves the carriage 100 to the right and elevates the carrier 175 to cause the field 12 to be presented for printing and perforation and so on. Thus the entire desired number of fields may be filled in on the card 10. The latter may thus be removed and a new card filled in and so on.

Other features of operation and advantages will now be obvious to those skilled in the art and need not be summarized nor dealt with at length.

The code illustrated in Fig. 1 is slightly different from that shown in Fig. 2 of my copending application entitled "Perforation-reading instrumentalities" (which is identical to Fig. 8 of my copending application "Record sheets and apparatus controlled thereby." In the present case the letter "A" is represented by perforations in the first, third and fourth hole spaces; the letter "C" is represented by perforations in the first, second and fourth hole spaces; the letter "M" is represented by perforations in the fourth and fifth hole spaces; and the letter "J" is represented by perforations in the first, second and fifth hole spaces. In Figs. 2 and 8 of my two last mentioned companion applications, the letter "A" is represented by perforations in the fourth and fifth hole spaces; the letter "C" by perforations in the first, second and fifth hole spaces; the letter "M" by perforations in the first, third and fourth hole spaces; and the letter "J" by perforations in the first, second and fourth hole spaces. With the exception of these four letters the codes are the same in these three different cases. It will be noted that, in all three cases, all of the combinations of perforations taken one at a time and all of the combinations of perforations taken two at a time are utilized before higher combinations are employed. Furthermore, it will be understood that the principle is the same in all cases and the machines illustrated in said copending applications may, with slight modification, be adapted for the code specifically disclosed in the present application, or the code in the present case may be changed to conform to that in said companion applications.

What I claim is—

1. The method of effecting any one of a number of different records representing different characters including the letters of the alphabet, which comprises perforating a record sheet in one or more hole spaces in a record field having the theoretical minimum number of hole spaces to accommodate any of the various distinctive records.

2. The method of effecting any one of a number of different records representing different characters including the letters of the alphabet and the digits, which comprises perforating a record sheet in one or more hole spaces in a record field having the theoretical minimum number of hole spaces to accommodate any of the various distinctive records.

3. A method as set forth in claim 1 in which any of six of the different records is effected by a single perforation and any of fifteen of the different records is effected by two perforations.

4. In combination, a plurality of individually movable keys, means called into action by the operation of any of said keys for printing a character corresponding to that key upon a record sheet, means called into action by the operation of any of said keys for perforating the record sheet to produce a combination arrangement of perforations corresponding to the character printed upon operation of that key, and means operable at will for rendering said keys ineffective to control one of said two first named means.

5. In combination, a plurality of individually movable keys, means called into action by the operation of any of said keys for printing a character corresponding to that key upon a record sheet, means called into action by the operation of any of said keys for perforating the record sheet to produce a combination arrangement of perforations corresponding to the character printed upon operation of that key, and means operable at will for rendering said keys ineffective to control said perforating means.

6. A machine of the class described comprising in combination, a perforating mechanism, a printing mechanism, and means for operating both of said mechanisms jointly or one of them to the exclusion of the other at will from a single key-board.

7. A machine of the class described comprising, in combination, a perforating mechanism, a printing mechanism, a plurality of individually movable control elements, means called into action by actuation of each of said elements for operating either said printing mechanism or both of said mechanisms, and means for determining whether both of said mechanisms or the printing mechanism alone shall operate.

8. A machine of the class described comprising in combination, perforating devices and a relatively movable sheet-carrier whereby different portions of a sheet in said carrier may be perforated in succession, means for effecting such relative movement of the carrier and devices, and means for preventing such relative movement until after the devices have been withdrawn from a sheet mounted on said carrier.

9. A selectively operable sheet-perforating machine comprising in combination, a support, a sheet-carrier laterally movable on said support, means for moving said carrier step-by-step, means for perforating a sheet carried by said carrier, and means for preventing operation of said first named means until after the withdrawal of the perforating means from the sheet.

10. A machine of the class described comprising in combination, perforating punches, printing type, a set of keys, means called into action upon actuation of said keys for causing said punches and type to perforate and print upon a record sheet, and means called into action upon release of any actuated key for first withdrawing said punches from the sheet and then shifting the same.

11. A machine of the class described comprising in combination, perforating punches, printing type, a plurality of keys, a movable sheet-carrier, means called into action upon actuation of any of said keys for first causing a corresponding combination of said punches to perforate a sheet and then causing a corresponding one of said type to print upon the sheet a character corresponding to the perforations, and means called into action upon release of the actuated key for withdrawing said punches from the sheet and then advancing said carrier.

12. A combined card-printing and card-perforating machine comprising a support, and a card-carrier laterally and longitudinally movable with respect to said support.

13. A machine of the class described comprising in combination, perforating mechanism for perforating a record sheet, printing mechanism for printing upon the same record sheet, and sheet-carrying means relatively movable to present successive lateral portions of a sheet to said mechanisms and successive longitudinal portions of the sheet to said mechanisms.

14. A combined card-printing and card-perforating machine comprising a support, a carriage laterally movable upon said support, and a card-carrier longitudinally movable upon said carriage.

15. A combined card-printing and card-perforating machine comprising a support, a card-carrier movably mounted with respect to said support, and means for moving said carrier step-by-step in steps of varying distances.

16. A combined card-printing and card-perforating machine comprising a support, a card-carrier movably mounted with respect to said support, a manually operable member, and means called into action by successive equal actuations of said member for moving said carrier different distances with respect to said support.

17. A machine for perforating record sheets comprising in combination, a set of at least five sheet-perforating devices, a set of keys equal in number to the number of said devices, means called into action upon actuation of each of said keys for causing operation of a corresponding one of said devices, key-controlled means for operating said devices in all possible combinations taken two devices at a time, and key-controlled means for operating said devices in various combinations of three devices at a time.

18. A machine for perforating record sheets comprising in combination, six sheet-perforating devices, and key-controlled means for operating at least thirty-two different combinations of said devices.

19. A machine of the class described comprising in combination, a plurality of sheet-perforating devices, and key-controlled means for operating at least twenty-five different character-representing combinations of the said devices one, two and three at a time.

20. A machine for perforating record sheets comprising in combination, six sheet-perforating devices, key-controlled means for operating at least ten different combinations of four of said devices, and key-controlled means for operating at least twenty-two different combinations of said six devices.

21. A machine of the class described comprising in combination, a plurality of individually operable keys, means called into action upon actuation of any of said keys for perforating a sheet in a manner corresponding to the actuated key, and means called into action by any actuated key for printing upon the perforated sheet a character corresponding to the perforation previously effected by that key.

22. A perforating machine comprising in combination, perforating devices, and a card-carrier laterally and longitudinally movable with respect to said perforating devices for presenting different fields to be perforated.

In testimony whereof I hereto affix my signature.

JOHN ROYDEN PEIRCE.